United States Patent
Takahashi et al.

(10) Patent No.: US 8,144,929 B2
(45) Date of Patent: Mar. 27, 2012

(54) HUMAN PURSUIT SYSTEM, HUMAN PURSUIT APPARATUS AND HUMAN PURSUIT PROGRAM

(75) Inventors: Kazuya Takahashi, Mito (JP); Wataru Ito, Nishitokyo (JP); Mitsue Ito, Kodaira (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 854 days.

(21) Appl. No.: 12/193,150

(22) Filed: Aug. 18, 2008

(65) Prior Publication Data

US 2009/0052739 A1 Feb. 26, 2009

(30) Foreign Application Priority Data

Aug. 23, 2007 (JP) ................................. 2007-217660

(51) Int. Cl.
*G06K 9/00* (2006.01)
(52) U.S. Cl. .......................................................... 382/103
(58) Field of Classification Search .................... 382/103
See application file for complete search history.

(56) References Cited

U.S. PATENT DOCUMENTS

| | | | | |
|---|---|---|---|---|
| 6,396,535 B1 * | 5/2002 | Waters | ........................... | 348/159 |
| 6,442,474 B1 * | 8/2002 | Trajkovic et al. | ............. | 701/117 |
| 6,584,211 B1 * | 6/2003 | Amemiya et al. | ............ | 382/103 |
| 6,816,186 B2 * | 11/2004 | Luke et al. | ..................... | 348/159 |
| 7,702,132 B2 * | 4/2010 | Crabtree | ........................ | 382/103 |
| 2003/0107649 A1 * | 6/2003 | Flickner et al. | ............... | 348/150 |

FOREIGN PATENT DOCUMENTS

| | | |
|---|---|---|
| JP | 10-048008 | 2/1998 |
| JP | 2004-096402 | 3/2004 |
| JP | 2004-348618 | 12/2004 |
| JP | 2005-100388 | 4/2005 |
| JP | 2006-093955 | 4/2006 |
| JP | 2006-195504 | 7/2006 |
| JP | 2006-209585 | 8/2006 |

* cited by examiner

*Primary Examiner* — Tom Y Lu

(74) *Attorney, Agent, or Firm* — Antonelli, Terry, Stout & Kraus, LLP.

(57) ABSTRACT

A human pursuit system includes a plurality of cameras, shooting directions of which are directed toward a floor, are installed on a ceiling, a parallax of an object reflected in an overlapping image domain is calculated on the basis of at least a portion of the overlapping image domain where images are overlapped among shot images shot by the plurality of cameras, the object equal to or greater than a threshold value predetermined by the calculated parallax is detected as a human, a pattern image including the detected human object is extracted, and a pattern matching is applied to the extracted pattern image and the image shot by the camera to thereby pursue a human movement trajectory.

14 Claims, 15 Drawing Sheets

LOCAL DEVICE (TYPE A)

LOCAL DEVICE (TYPE B)

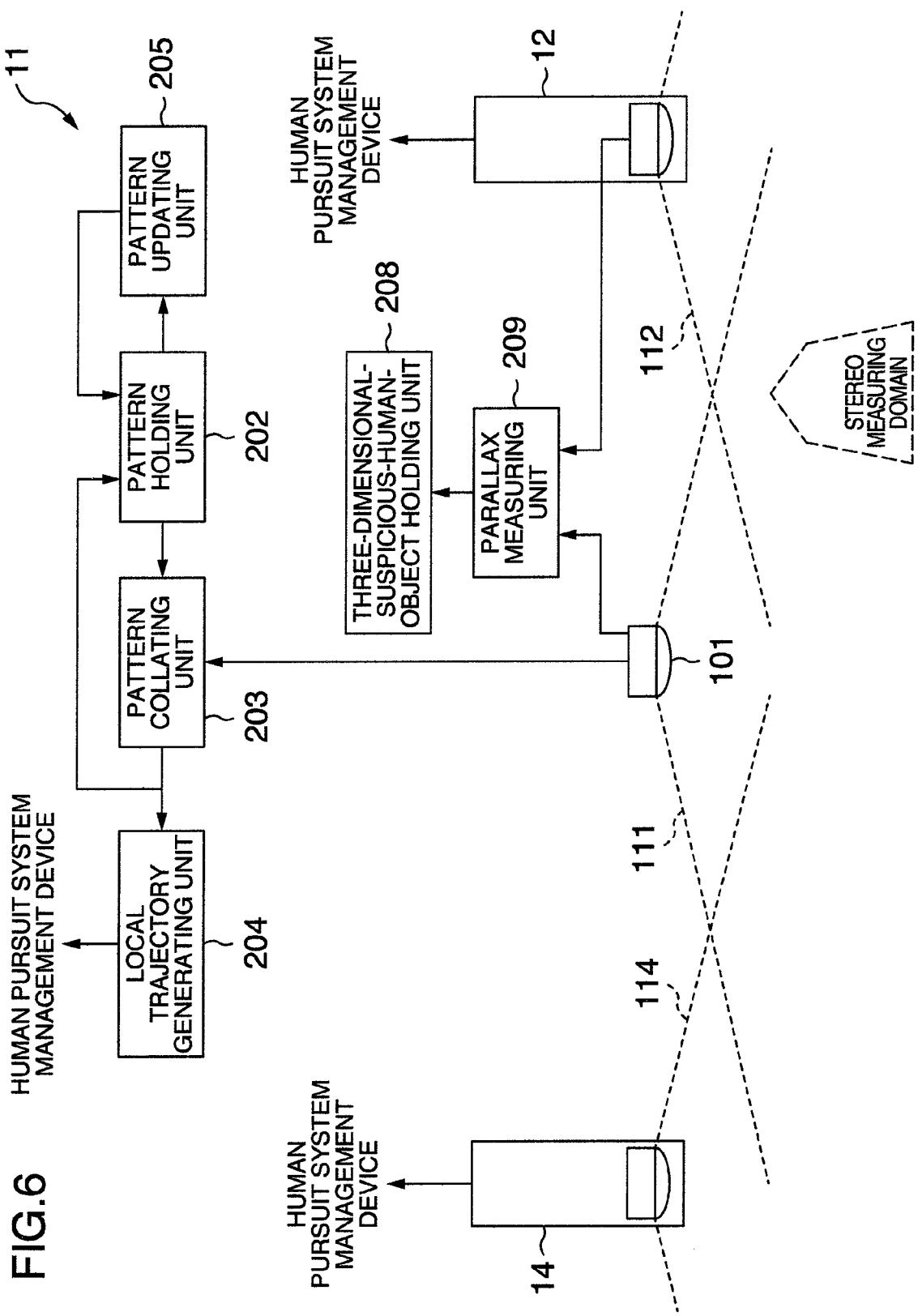

EXAMPLE OF OVERHEAD IMAGE SHOT BY WIDE-ANGLE CAMERA

EXAMPLE OF WALKING HUMAN

EXAMPLE OF PARALLAX IMAGE

DIAGRAM OF EXTRACTING THREE-DIMENSIONAL-SUSPICIOUS-HUMAN-OBJECT RELATIVE TO PARALLAX IMAGE

IMAGE APPLIED BY MASK PROCESSING USING BINARIZED IMAGE (FIG. 7D) FOR OVERHEAD IMAGE (FIG. 7A) SHOT BY CAMERA

FIG.8A (PARALLAX IMAGE)
↓
S11 — BINARIZE
↓
S12 — MOHOLOGICAL PROCESSING
↓
S13 — LABELING
↓
S14 — MEASURE CENTER COORDINATE OF EVERY LABEL
↓

| LABEL 1 | CENTER COORDINATE (X1,Y1), VERTICAL AND HORIZONTAL SIZE OF SURROUNDING RECTANGLE |
| LABEL 2 | CENTER COORDINATE (X2,Y2), VERTICAL AND HORIZONTAL SIZE OF SURROUNDING RECTANGLE |
| ⋮ | ⋮ |
| LABEL n | CENTER COORDINATE (Xn,Yn), VERTICAL AND HORIZONTAL SIZE OF SURROUNDING RECTANGLE |

CALCULATION PROCESSING FLOW FOR CENTER COORDINATE OF THREE-DIMENSIONAL-SUSPICIOUS-HUMAN OBJECT

FIG.8B

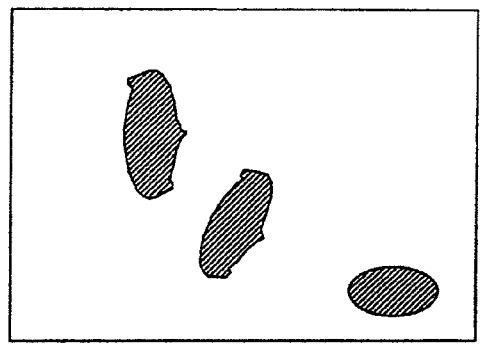

IMAGE AFTER APPLYING MOHOLOGICAL PROCESSING

FIG.8C

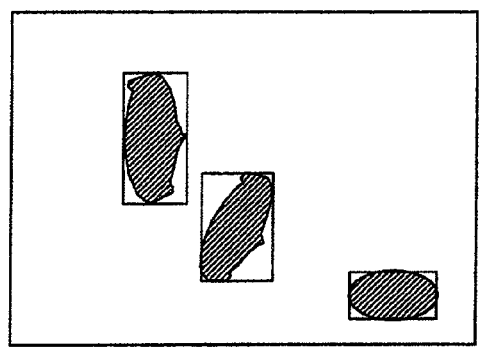

SURROUNDING RECTANGLE OVERLAPPED WITH PIXEL GROUP

FIG.9
| HUMAN OBJECT NUMBER | COORDINATE/ SIZE OF SURROUNDING RECTANGLE | BRIGHTNESS PATTERN | COLOR HISTOGRAM | EDGE HISTOGRAM | FOURIER SPECTRUM |
|---|---|---|---|---|---|
| 1 | (X1,Y1) |  |  | 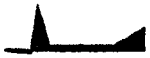 |  |
| 2 | (X2,Y2) |  |  |  |  |
| 3 | (X3,Y3) |  |  |  |  |
| ⋮ | ⋮ | ⋮ | ⋮ | ⋮ | ⋮ |

| TRANSMISSION TIMING | HUMAN OBJECT NUMBER / TIME | 1 | 2 | ... | 12 |
|---|---|---|---|---|---|
| s1 | 061224:13:15:24:0 | (1X1,1Y1) | (2X1,2Y1) | ... | – |
| | 061224:13:15:24:1 | (1X2,1Y2) | (2X2,2Y2) | ... | – |
| | 061224:13:15:24:2 | (1X3,1Y3) | (2X3,2Y3) | ... | – |
| | 061224:13:15:24:3 | (1X4,1Y4) | (2X4,2Y4) | ... | – |
| | 061224:13:15:24:4 | (1X5,1Y5) | (2X5,2Y5) | ... | – |
| | 061224:13:15:24:5 | (1X6,1Y6) | (2X6,2Y6) | ... | (12X6,12Y6) |
| | ... | ... | ... | ... | ... |
| | 061224:13:15:24:24 | (1X25,1Y25) | (2X25,2Y25) | ... | (12X25,12Y25) |
| | 061224:13:15:24:25 | (1X26,1Y26) | (2X26,2Y26) | ... | (12X26,12Y26) |
| | 061224:13:15:24:26 | (1X27,1Y27) | (2X27,2Y27) | ... | (12X27,12Y27) |
| | 061224:13:15:24:27 | – | (2X28,2Y28) | ... | (12X28,12Y28) |
| | 061224:13:15:24:28 | – | (2X29,2Y29) | ... | (12X29,12Y29) |
| | 061224:13:15:24:29 | – | (2X30,2Y30) | ... | (12X30,12Y30) |
| s2 | | | | | |
| ⋮ | | | | | |

OUTPUT FROM LOCAL TRAJECTORY GENERATING UNIT AND TRANSMISSION TIMING

EXAMPLE OF CAMERA PERSPECTIVE BY LOCAL DEVICE AND LOCAL TRAJECTORY BASED ON COMMUNICATION DATA AT COMMUNICATION TIMING S1

FIG.16

| RECEPTION TIMING | s1 | s2 | --- | k-1 | k | k+1 | k+2 |
|---|---|---|---|---|---|---|---|
| TIME | t0,--- | --- | --- | --- | --- | --- | --- |
| MERGING INFORMATION | | | | | 12CAM:34CAM4 | | |
| CAM1 | | | | | 12CAM1 | | |
| CAM2 | | | | 11CAM1 | | | |
| CAM3 | | | | | | | |
| CAM4 | | | | | 34CAM4 | | |
| ⋮ | | | | | | | |
| CAM9 | | | | | 33CAM4 | | |

HUMAN PURSUIT SYSTEM, HUMAN PURSUIT APPARATUS AND HUMAN PURSUIT PROGRAM

BACKGROUND OF THE INVENTION

The present invention relates to a human pursuit system, a human pursuit apparatus and a human pursuit program, and particularly to a human pursuit technique capable of providing on a ceiling in a building, and suitable for measuring human movement trajectories in the buildings or stores.

A measurement for the human movement trajectories is sometimes performed for purposes of security measures, traffic counts, customer preference surveys in stores, etc.

For example, JP-A-2004-348618 discloses a technique to obtain human movement trajectories in a store, in which a number of cameras installed in the store take pictures of customers who are shopping and moving therein, features such as gender, age, costume, etc. are recognized for every frame of images relative to the pictures, an identification processing is carried out by using the recognized feature to identify with images one another taken by the other cameras, and a human movement trajectory in the store is then obtained from the processing. Further, JP-A-2006-209585 discloses a technique for using a face-recognition processing to identify human objects.

SUMMARY OF THE INVENTION

However, the cameras are often installed close to a ceiling at a small depression angle for a purpose of making an open space covered by a camera broad, in related techniques. For example, in the case where there are a number of blocking objects in a small store where customers are crowded in an open space, the movement trajectory of human cannot be pursued accurately in the store since the human is hidden behind goods or others.

According to the foregoing related techniques, the identification processing for human object is performed by using the features containing the gender, age costume, etc. and a result of the face-recognition processing, obtained from the human images. However, it is necessary to take pictures in high resolution for a purpose of extracting the face-recognition processing and an amount of features. Therefore, it is also necessary to use high performance cameras or a number of cameras. Besides, a pursuing accuracy for the human movement trajectory is deteriorated since the identification processing causes an error in response to a face direction and a position of the human object.

An object of the invention is to provide a human pursuit system, a human pursuit apparatus, and a human pursuit program, which is able to pursue a human movement trajectory in high accuracy even though blocking objects are resided in an open space.

According to an aspect of the invention, a human pursuit system includes: a plurality of cameras installed on a ceiling and shooting directions of these directed toward a floor; means that calculates a parallax of an object reflected in an overlapping image domain in accordance with at least a portion of the overlapping image domain where images are overlapped, among shot images shot respectively by the plurality of cameras; means that detects the object, as a human, when the calculated parallax is greater than a predetermined threshold value; means that extracts a pattern image containing the detected human; and means that pursues a trajectory on which the human moves, by a pattern matching of the extracted pattern image with the shot image by the camera.

According to another aspect of the invention, the human pursuit system further includes calculation means that calculates a position coordinate of the human residing on the floor in accordance with a position of the pattern image containing the detected human and the parallax calculated for the human.

According to still another aspect of the invention, the human pursuit system further includes storage means that stores the extracted pattern image for every detected human, and update means that updates the pattern image stored in the storage means in accordance with a result of the pattern matching.

According to still another aspect of the invention, the storage means in the human pursuit system stores the position coordinate of the pattern image on the floor in association with the pattern image, and the update means therein updates the pattern image in accordance with an image domain of the human detected from the overlapping image domain in the case where the stored pattern image is contained in the overlapping image domain.

According to still another aspect of the invention, the update means in the human pursuit system removes the pattern image in the case where the stored pattern image is contained in the overlapping image domain and a human is undetected from the overlapping image domain.

According to still another aspect of the invention, the human pursuit system further includes means that extracts feature amount data from the pattern image, and the extracted feature amount data is used for the pattern matching.

According to still another aspect of the invention, the feature amount data in the human pursuit system includes at least one of a brightness pattern, a color histogram, a ratio of color components, an edge histogram, a Fourier spectrum, and a Fourier-Mellin spectrum.

According to still another aspect of the invention, the human pursuit system further includes means that generates a trajectory on which the detected human moves every shot domain pursued by the plurality of cameras.

According to still another aspect of the invention, the human pursuit system further includes means that merges the generated trajectories for every detected human.

According to still another aspect of the invention, the plurality of cameras in the human pursuit system are adjusted respectively such that a shooting angle is directed toward a vertically downward direction.

According to still another aspect of the invention, the human pursuit system further includes means that stores attribute information obtained for the detected human in association with the trajectory obtained for the detected human.

According to still another aspect of the invention, the attribute information in the human pursuit system is obtained from reading non-contact radio tag information provided for the human.

Further, the human pursuit apparatus in the invention includes: means that obtains images shot by a plurality of cameras installed on a ceiling and shooting directions of these directed toward a floor; means that calculates a parallax of an object reflected in an overlapping image domain in accordance with at least a portion of the overlapping image domain where the images are overlapped, among shot images shot respectively by the plurality of cameras; means that detects the object, as a human, when the calculated parallax is greater than a predetermined threshold value; means that extracts a pattern image containing the detected human; and means that pursues a trajectory on which the human moves, by a pattern matching of the extracted pattern image with the shot image by the camera.

Further, the human pursuit program readable, as program codes, by a computer includes: program code means that obtains images shot by a plurality of cameras installed on a ceiling and shooting directions of these directed toward a floor; program code means that calculates a parallax of an object reflected in an overlapping image domain in accordance with at least a portion of the overlapping image domain where the images are overlapped, among shot images shot respectively by the plurality of cameras; program code means that detects the object, as a human, when the calculated parallax is greater than a predetermined threshold value; program code means that extracts a pattern image containing the detected human; and program code means that pursues a trajectory on which the human moves, by a pattern matching of the extracted pattern image with the shot image by the camera.

According to the invention, the human movement trajectory can be made pursued in high accuracy even though blocking objects reside in an open space.

According to the invention, a human object is detected in accordance with the shot images shot by the plurality of cameras, the shot areas of which are overlapped, and a position of the human object as a position coordinate on the floor is obtained from a perspective transformation based on the parallax, so that the human movement trajectory can be made pursued in high accuracy.

According to the invention, the cameras are adjusted so that the shooting direction is directed toward the floor in the vertically downward direction, therefore, an error in the perspective transformation performed the position of human transformed to a coordination system from the shot image can be made small, and the human movement trajectory can be pursued in high accuracy.

According to the invention, since the cameras are installed on the ceiling to shoot the floor, a block for a human residing in a distance hardly occurs by causing a human residing in proximity to the camera, and a stereo measurement domain (overlapping image domain) using the parallax is also limited to a narrow range from the ceiling to the floor, so that the human movement trajectory can be made pursued in high accuracy.

According to the invention, after a human object is detected by using a portion of the stereo measurement domain (overlapping image domain), the human object is pursued by the pattern matching processing using the pattern image of the detected human object in domains other than the stereo measurement domain, so that a processing load can be reduced.

The other objects, features and advantages of the invention will become apparent from the following description of the embodiments of the invention taken in conjunction with the accompanying drawings.

BRIEF DESCRIPTION OF THE DRAWINGS

FIG. 6 is a functional block diagram showing an another combination example of the local devices;

FIG. 8A is a processing flow diagram of a three dimensional-suspicious-human object holding unit;

FIG. 8B is a diagram showing an image subject to a moholological processing;

FIG. 8C is a diagram showing surrounding rectangles overlapped together with pixel groups;

FIG. 9 is a diagram showing an example of a pattern data table held in a pattern holding unit;

FIG. 16 is a diagram for explaining output data from the trajectory merging unit.

DETAILED DESCRIPTION OF THE INVENTION

Hereinafter, embodiments of the invention will be described with reference to the drawings.

Figure 1:
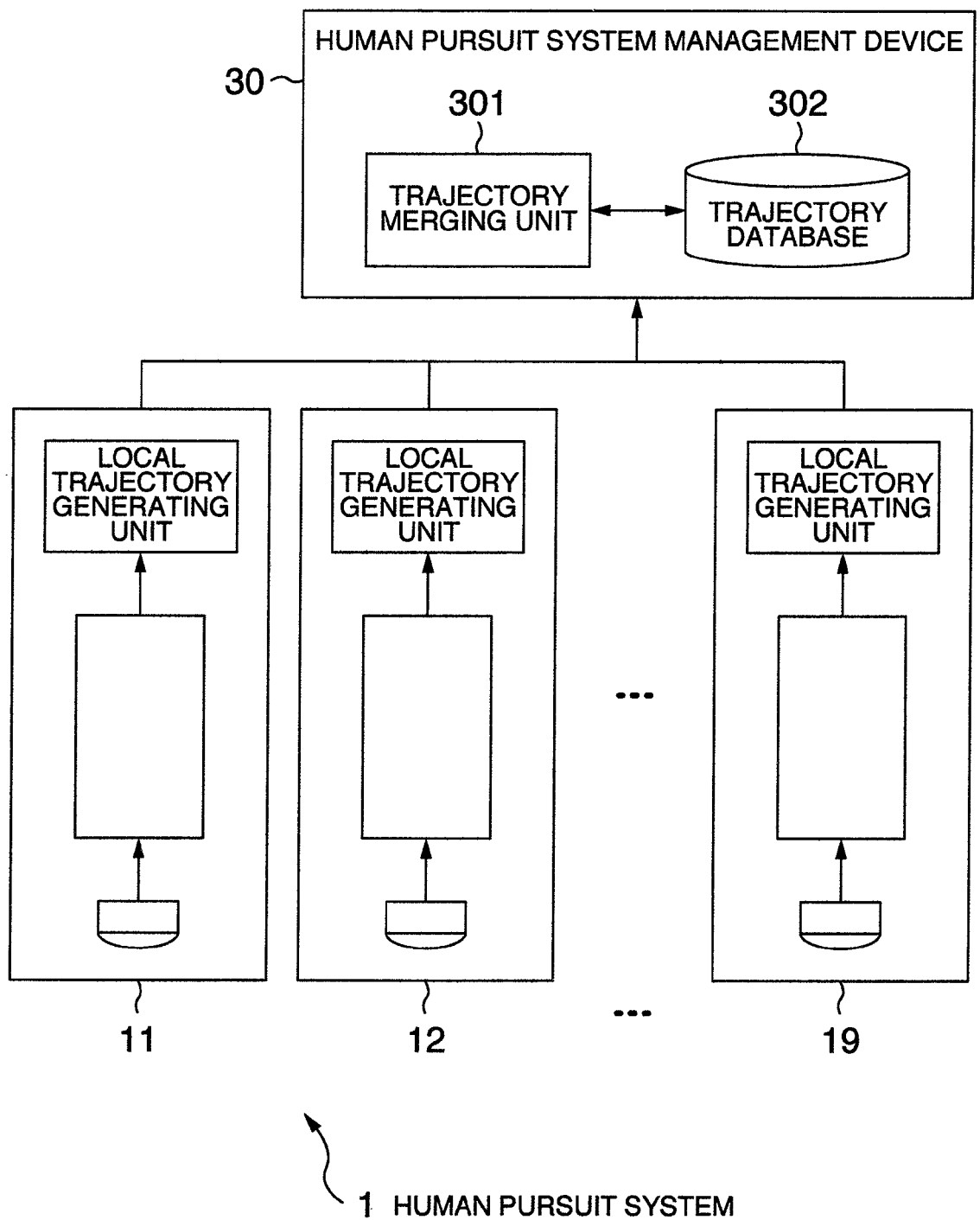
FIG. 1 is a constitutional diagram showing a human pursuit system in an embodiment of the invention.

FIG. 1 is a diagram showing a human pursuit system 1 in an embodiment of the invention. As shown in FIG. 1, the human pursuit system 1 includes a plurality of local devices 11, 12, . . . 19. Each of the local devices has a wide-angle camera installed on a ceiling in a building to be measured and adjusted with its shooting angle so as to be faced substantially straight to a floor in the building.

Each of the local devices processes in turn every frame of images obtained from the camera to pursue a trajectory indicating that an object (human) reflected by the camera moves on shot areas. Pursued trajectory data is transmitted to a human pursuit system management device 30 at every predetermined time period, for example, every one second or 30 frames etc. Data transmission/reception between the local device and the human pursuit system management device 30 may be performed by a dedicated signal line, and may also be performed by a network using a protocol of TCP/IP etc.

It is assumed that the trajectory data obtained from the local device is represented by a coordination system (hereinafter, referred to as a floor coordination system) in which a specific place in a floor domain shot by the camera of the local device is set to an origin. In addition, a position coordinate in the floor coordination system of human objects detected by the respective local devices may be computed by a known perspective transformation processing.

The human pursuit system management device 30 provides with a trajectory merging unit 301 and a trajectory database 302. The trajectory merging unit 301 merges the trajectory data, in conjunction with an identical human object, received from the respective local devices at every predetermined time period. The merged successive trajectory data is stored in the trajectory database 302. This storing operation of the trajectory data in the trajectory database 302 may be performed at every predetermined time period.

In this embodiment, there are two types for the local device: type A and type B.

Figure 2:
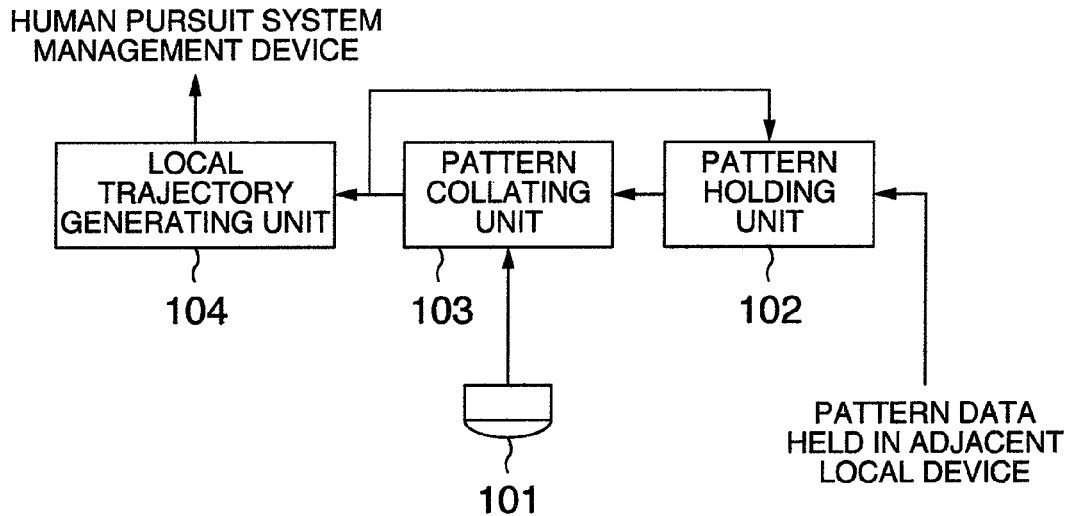
FIG. 2 is a functional block diagram showing a type-A local device.

FIG. 2 shows an example of a type-A local device. The type-A local device is installed on a ceiling or an open space in a building, and constituted by a wide-angle camera 101, the shooting direction of which is adjusted to be faced substantially straight to the floor, a pattern holding unit 102, a pattern collating unit 103, and a local trajectory generating unit 104.

The pattern holding unit 102 extracts feature amount data from an image domain in which a detected human object is reflected, and holds it. The feature amount data to be extracted may be used of various pieces of information, such as, a brightness distribution, a ratio of color components of red, green, blue, etc., a ratio of respective directional components in local directions of a human object contour divided into eight proximity directions, a Fourier spectrum of an image domain, a Fourier-Mellin spectrum, etc. The extracted feature amount data is stored in a memory as a pattern data table in association with a human identification (ID) to be identified the detected human object.

The human ID is identification information to be given at a time of starting a human pursuit performed by each of the local devices. The human ID may be given by numbering the local devices in sequence, and an inherent ID may also be given to each human object by using an ID of the local device, a time when the human pursuit starts, and a number generated by the floor coordinate, in the human pursuit system as a whole.

The pattern collating unit 103 performs a pattern matching processing for the image shot by the wide-angle camera 101 by using the pattern, as a template, turned into table data held in the pattern holding unit 102. As a result of the pattern matching processing, the pattern collating unit 103 sets a center of most similar domain to a feature of the template, to a new position coordinate of the human object in the floor coordination system to output the position coordinate to the local trajectory generating unit 104. Further, the pattern collating unit 103 outputs, to the pattern holding unit 102, the feature amount in association with brightness pattern data of a pattern image segmented from the images on the basis of the new position coordinate, and a color, an edge, a spectrum, etc, extracted from the pattern image, together with the position coordinate in the floor coordination system.

The pattern holding unit 102 updates the pattern data table on the basis of the data input from the pattern collating unit 103. Further, the pattern holding unit 102 also accepts inputs of the various feature amount containing the brightness data in first, together with the position coordinate in association with an object covered by the perspective of wide-angle camera 101, from the pattern collating unit 103 in an adjacent local device. The pattern holding unit 102 adds the new human ID and its feature amount to the pattern data table to update this table on the basis of the accepted data.

The local trajectory generating unit 104 generates a movement trajectory of the human ID stored as table data in the pattern holding unit 102 at every predetermined time period, such as, one second or an amount of 30 frames, to output to the human trajectory system management device 30 for a predetermined time interval. In the case of the pattern matching processing performed in the pattern collating unit 103, for example, a correlation coefficient is calculated from between a scanning image and the template, and a proximal domain to 1 is then set to a collation result. The correlation coefficient may be calculated by calculating correlation coefficients of the respective colors of red, green and blue first, then adding the respective correlation coefficients with a predetermined weight. Further, the collation method using the correlation coefficient may use a known normalization correlation.

Figure 3:
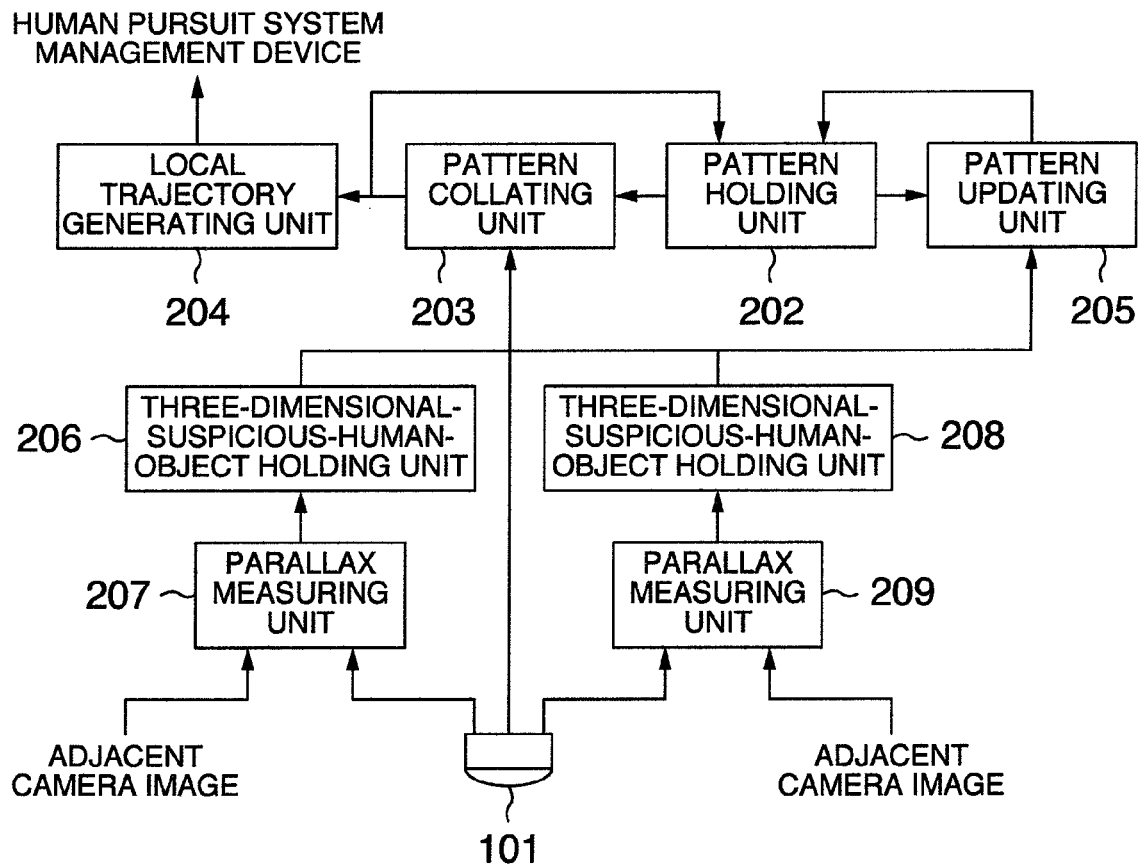
FIG. 3 is a functional block diagram showing a type-B local device.

FIG. 3 is a diagram showing a functional block example of a type-B local device. As shown in FIG. 3, The type-B local device is constituted by the wide-angle camera 101 faced straight to the floor, a pattern holding unit 202, a pattern collating unit 203, a local trajectory generating unit 204, a pattern updating unit 205, a three-dimensional-suspicious-human-object holding unit 206, a parallax measuring unit 207, a three-dimensional-suspicious-human-object holding unit 208, and a parallax measuring unit 209. Since operations of the pattern holding unit 202, pattern collating unit 203, and local trajectory generating unit 204 are the same as those of the pattern holding unit 102, pattern collating unit 103, and local trajectory generating unit 104, respectively, descriptions for those are therefore omitted.

The parallax measuring units 207, 209 generate a parallax image on the basis of a parallax measured for the shot area where the image given by the wide-angle camera 101 is overlapped with an image given by another camera adjacent thereto.

Both the units 206, 208 binarize respectively the parallax images generated from the parallax measuring units 207, 209 by using a predetermined threshold value to thereby hold a center coordinate of a suspicious human object domain concerned with an upper body of the human and a suspicious human object list having a vertical and horizontal size of the suspicious human object domain. In addition, the suspicious human object domain may be corresponded to a surrounding rectangle of the upper body image of the human.

The pattern updating unit 205 will be described in detail later. In the case where a mismatch occurs for the suspicious human object list held in the units 206, 208, the pattern data table held in the pattern holding unit 202, and a position of the human object on pursuit and the vertical and horizontal size of the surrounding rectangle, the pattern data held in the pattern holding unit 202 for the human object on pursuit is updated on the basis of the suspicious human object list held in the units 206, 208.

Further, a pattern data is added to the pattern data table of the human object on pursuit held in the pattern holding unit 202 as a human newly going into the shot area when the pattern data is present in the suspicious human object list held in the units 206, 208, but the pattern data is absent in the pattern data table of the human object on pursuit held in the pattern holding unit 202. At this time, newly given human ID may be named by setting an ID of local device, a time when the pursuit of the human starts, and a number having the floor coordinate.

In addition, the respective devices contained in the human pursuit system 1 may realize the foregoing functions by reading computer readable program codes stored in a computer readable recording medium (DVD-ROM, CD-ROM, Flash-memory, etc.) via a medium reading device (not shown).

Figure 4:
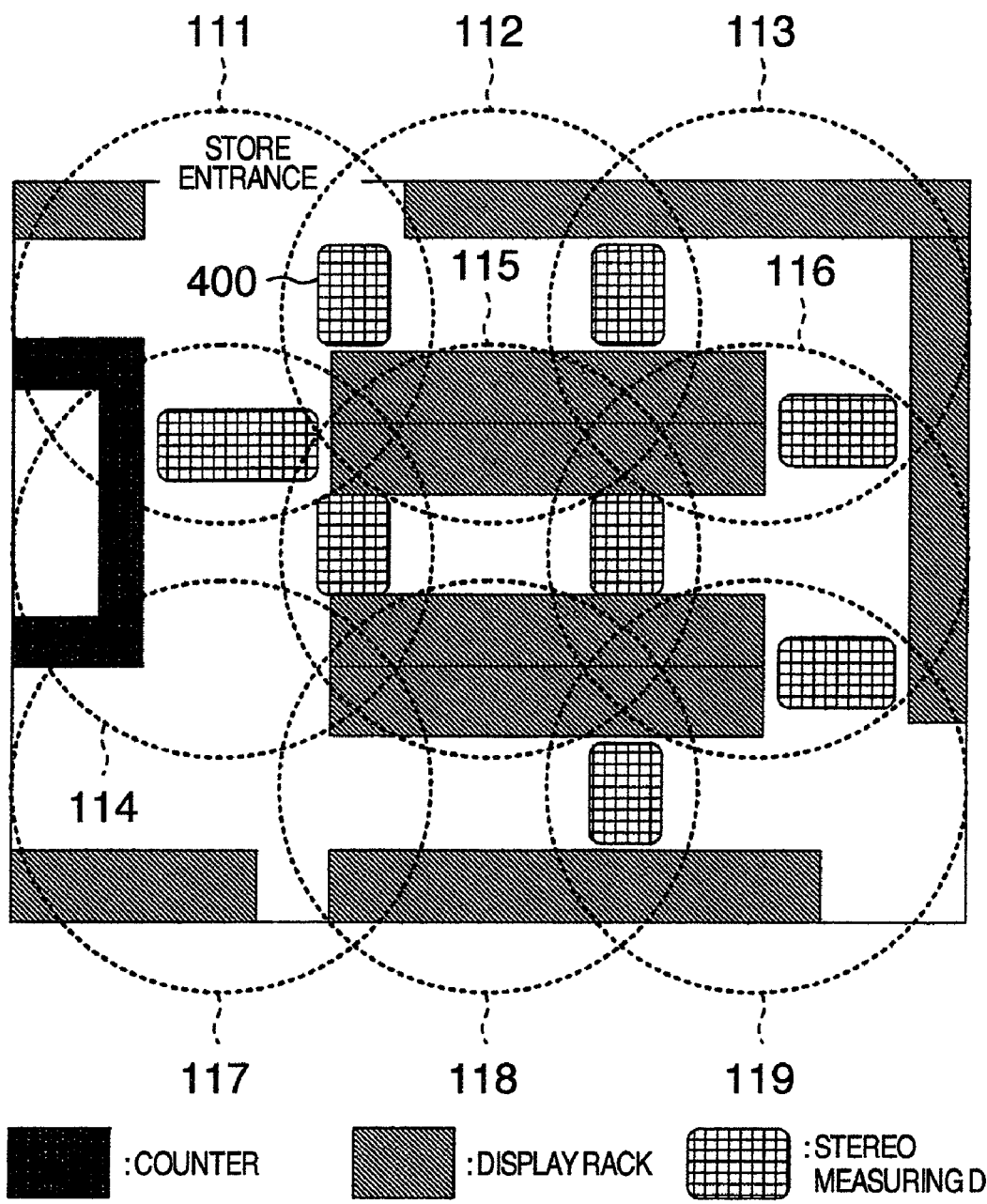
FIG. 4 is a diagram showing an arrangement example of the local devices.

Here, FIG. 4 shows an arrangement example of the local devices in a retail store as human pursuit system 1. Referring to FIG. 4, shot areas covered by the wide-angle cameras provided respectively in the local devices are illustrated by circles in an overhead view of the retail store. In this case, a store entrance is located at the top of overhead view, and a counter is located at the left side thereof. Rectangles with diagonal lines indicate high-rise display racks, and the top of high-rise display racks and an opposite side of the racks are invisible from the wide-angle camera since the opposite side of the display rack is blocked by itself, even though the display rack is located in the circle as a shot area covered by the camera, but displaced from the center of circle.

In the case of FIG. 4, nine local devices 11, 12, ..., 19 are installed, and the shot areas 111 to 119 covered by the wide-angle cameras contained respectively in the local devices are illustrated by the circles. Further, overlapping domains caused by the shot areas covered by the adjacent cameras are illustrated by waffle patterns as a stereo measuring domain 400.

Figure 5:
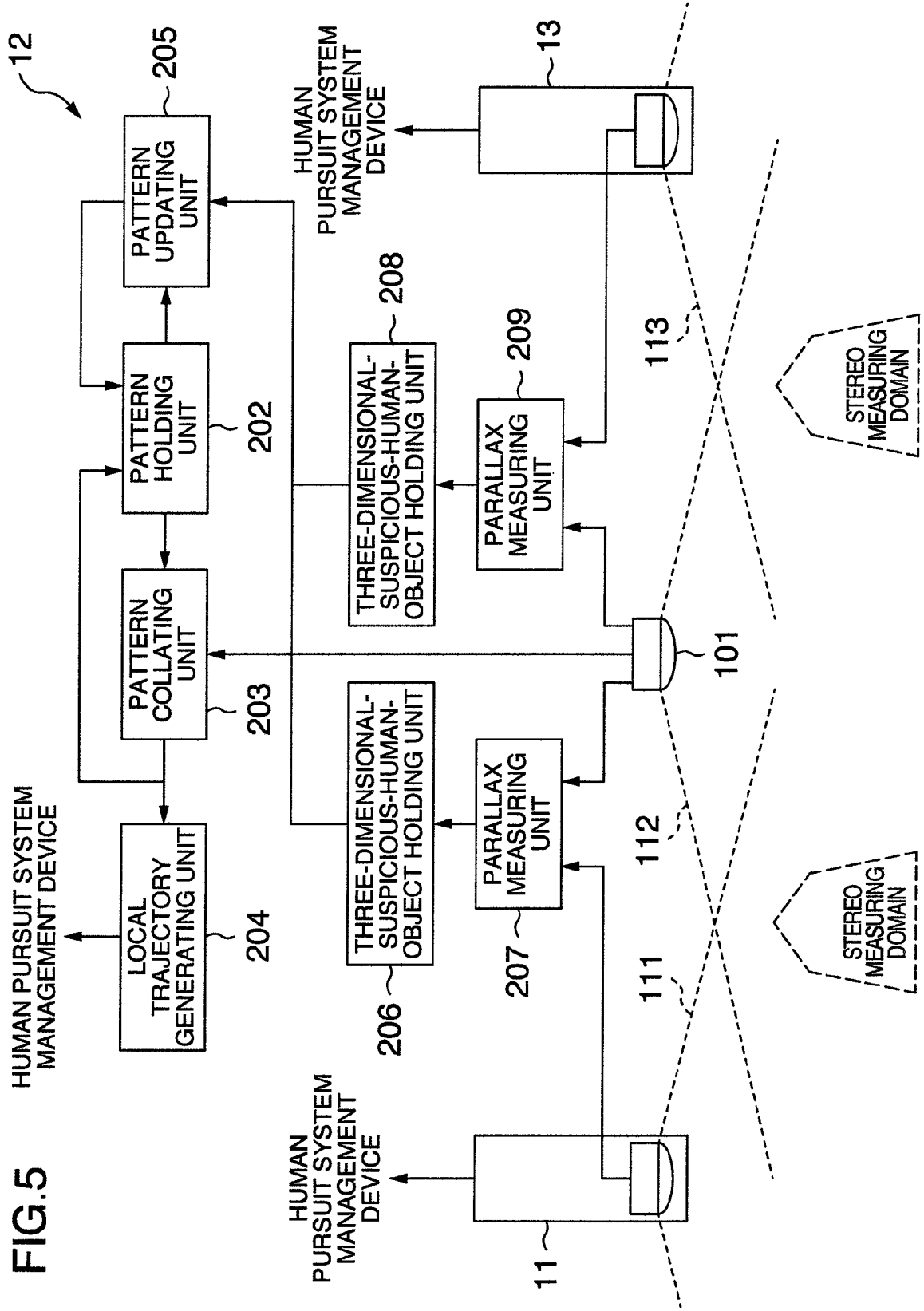
FIG. 5 is a functional block diagram showing a combination example of the local devices.

FIG. 5 is a diagram showing a combination example of the local devices in the human pursuit system 1. In the case of the combination shown in FIG. 5, the type-B local devices 11, 13 are arranged adjacent to the type-B local device 12 respectively having the wide-angle camera 101. Basically, the human object is pursued by the pattern matching processing at near the center of shot area covered by the wide-angle camera. In the case of the overlapping domain of near the periphery shot area and another shot area covered by the other cameras, the human object is pursued with confirmation of a three dimensional configuration by the stereo measurement. In the case of the overlapping domain (stereo measuring domain) of the shot areas, it is unnecessary to use a background difference method or an interframe difference method for detecting and pursuing the human object, so that the detection and pursuit for the human object can be performed appropriately even for a slow moving human and a stationary human.

Further, the combination of the local devices in the human pursuit system 1 is not limited to the foregoing examples. As shown in FIG. 6, the type-A local device 14 may be incorporated into a portion of the local device. The type-A local device is incorporated into the human pursuit system 1, so that a load of the parallax measurement can be reduced in the human pursuit system 1 as a whole. The type-A local device is installed on a place where the human moves in and out once in a while, so that a processing load can be reduced without deteriorating the human detecting accuracy in the human pursuit system 1 as a whole.

Figure 7A:
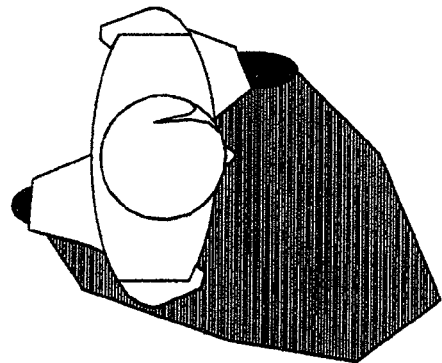
FIGS. 7A to 7E are diagrams showing output examples from a parallax measuring unit.
Figure 7B:
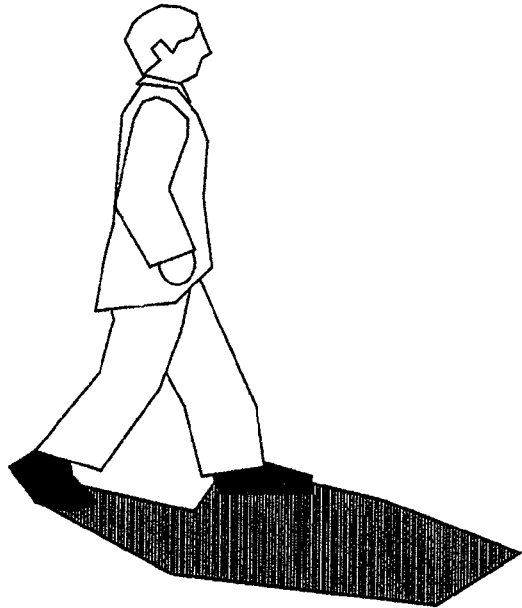
Figure 7C:
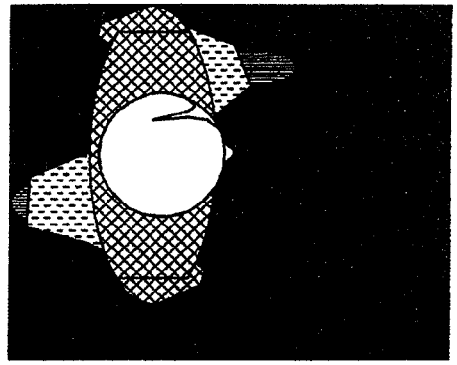
Figure 7D:
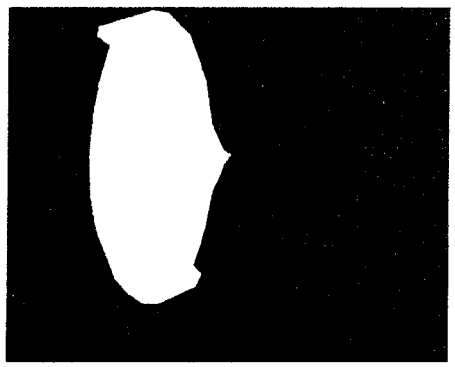
Figure 7E:
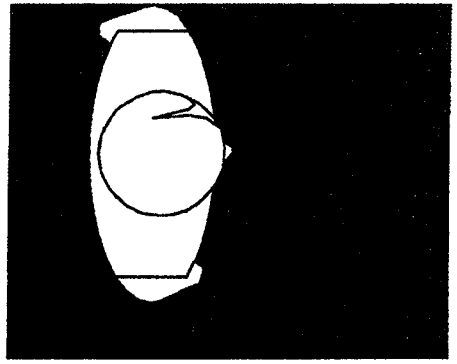

FIGS. 7A to 7E are explanatory diagrams showing examples of parallax images output from the parallax measuring units 207, 209. FIGS. 7A and 7B show an example of a moving human with a shade. FIG. 7A is an overhead image shot by the wide-angle camera in the local device, and seen the human from above in FIG. 7B. A camera (not shown) adjacent to the other also shoots the same human, and the floor coordinate of a human standing position can be obtained from the perspective transformation. However, as a height increases from the floor level, a displacement amount of the image increases. Therefore, the displacement increases in order from portions of legs, abdomen, shoulder and head. FIG. 7C shows a parallax image obtained from changing patterns for the portions of head, shoulder and legs, on the basis of the displacement amount. The portion of shade has the same size as that of the parallax on the floor, so that an error detection caused by reflection in the shade and floor is prevented by extracting a domain having the parallax larger than a predetermined size. FIGS. 7D and 7E will be described later.

FIG. 8A is an explanatory diagram showing a processing of the units 206 and 208. The units 206 and 208 process the following steps for the parallax image generated from the parallax measuring unit 207 or 209 to thereby update the suspicious human object list.

The unit 206 binarizes the parallax image generated from the parallax measuring unit 207 in comparison with a predetermined threshold value (step S11). The threshold value may be changed in response to a height of the human object to be detected, for example, setting the threshold value to high is targeted to a tall human, and setting to low is targeted to a not tall human, including adult and children.

Next, a mohological processing (expansion and contraction processing) is given to the binarized image to perform a correction processing, such as a link of detached objects, removal of isolated points, filling of objects, etc. (step S12). A labeling processing is given to the binarized image obtained from the mohological processing. The labeling processing is performed so that the binarized image is divided into pixel groups in response to a link condition of four or eight proximal pixels, and a label is assigned to every pixel group (step S13). A surrounding rectangle of the pixel group is then set in response to the division by the labeling processing. A center coordinate of the surrounding rectangle is measured in response to the setting of every label, and a vertical and horizontal pixel size is also measured in response to the surrounding rectangle to update the suspicious human object list (step S14).

FIG. 8B shows an image after applying the mohological processing, and the domains with diagonal lines show the pixel groups divided by the labeling processing. FIG. 8C is a diagram illustrating the surrounding rectangles overlapped together with the respective pixel groups relative to the labeling processing. Here, FIG. 7D shows an image after applying the successive processing of FIG. 8A to the parallax image. FIG. 7E shows an image after applying a mask processing using FIG. 7D as a mask image to the overhead image in FIG. 7A. Here, brightness information for the upper body portion having a certain height is only remained, the brightness information for the portion having no height, such as, the floor and shade is masked as zero. FIG. 7E shows black where is masked as zero. In the case of the pattern holding unit to be described later, a domain other than the zero is held therein as a brightness pattern.

FIG. 9 shows an example of the pattern data table held in the pattern holding units 102 and 202. The pattern data table is constituted by a record in association with coordinate information for every human ID, brightness pattern, color histogram, edge histogram, and Fourier spectrum. An identification number managed by the local device is given to the human ID so that a human object on the different trajectory is not assigned with the same identification number. In addition, in the case where the same human left the shot area once and comes in that area again, a different identification number is assigned to that human object. The coordinate information may contain the center coordinate of the surrounding rectangle of the respective patterns and the number of pixels in the vertical and horizontal of the surrounding rectangle. In the case of the foregoing example, the pattern data table stores the brightness pattern, color histogram, edge histogram, and Fourier spectrum, as the feature amount of the pattern image, however, it may store a portion of these, and may also store other feature amounts.

Figure 10:
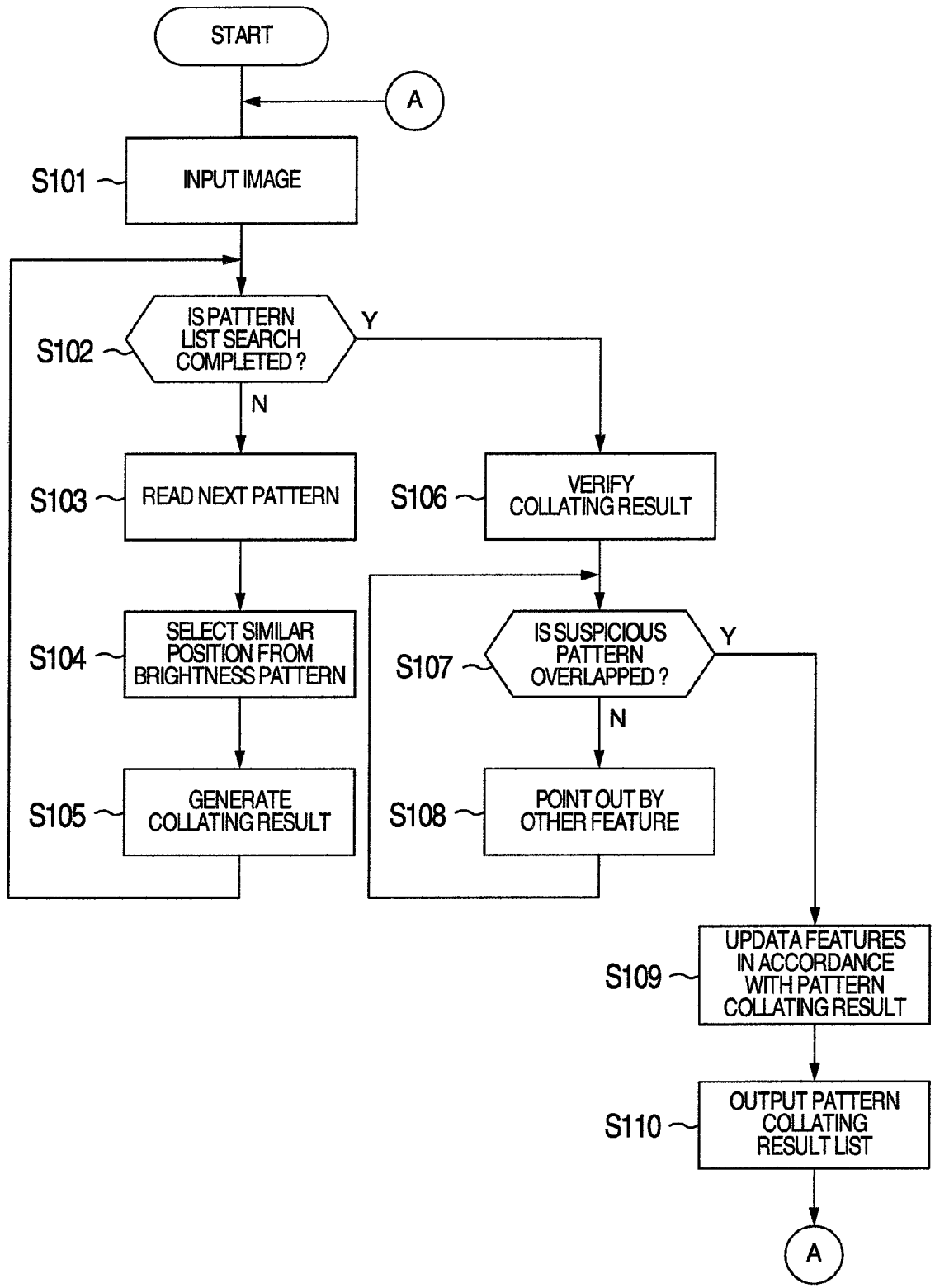
FIG. 10 is a processing flow diagram of a pattern collating unit.

FIG. 10 is a diagram showing a processing flow of the pattern collating units 103 and 203. The human pursuit system 1 is constituted so that a one-cycle processing is performed by inputting every one-frame image from the wide-angle camera 101. The wide-angle camera 101 supplies one-frame of the shot image to the pattern collating unit 103 (step S101).

The pattern collating unit 103 searches the pattern data table held in the pattern holding unit 102 or 202 (step 102). One pattern, for example, the brightness pattern is then read from a table in the pattern data table if the search is not completed (step S103). The pattern collating unit 103 scans the image supplied with the brightness pattern which is read, to extract an image domain having the highest correlation with the brightness pattern (step S104). A known normalization-correlation calculation may be used for the calculation of pattern correlation. In addition, the correlation calculation may also use the brightness pattern of Fourier spectrum, color histogram, and edge histogram. The correlation may also be calculated after standardization is made by using an average value obtained from those values and a summation of the histograms.

The pattern collating unit 103 sets an image domain indicating that the calculated correlation is equal to or greater than a predetermined value, to a suspicious human object pattern (step S105). As described above, the steps 102 to 105 are repeated, and a verification processing for the suspicious human object pattern is performed after completing the search of the pattern data table (step S106). Here, confirmation is made whether one pattern contains plural suspicious human object patterns (step S107). If there are plural suspicious human object patterns, one suspicious human object pattern is pointed out eventually on the basis of the correlation which is high or low caused by the color histogram, edge histogram, and Fourier spectrum (step S108). By determining one suspicious human object pattern eventually, the feature amount is calculated for the brightness pattern, color histogram, edge histogram, Fourier spectrum, etc. on the basis of its suspicious human object domain. The pattern data table is then updated by using the calculated feature amount (step S109).

The updated pattern data table is output to the pattern holding unit 202 (step S110). The human ID and center coordinate among data in the pattern data table are only output to the local trajectory generating units 104 and 204. Further, the pattern size may be maintained as an initial pattern, and may also be changed on the basis of a table which is formed in response to a perspective position covered by the camera in advance.

Figure 11:
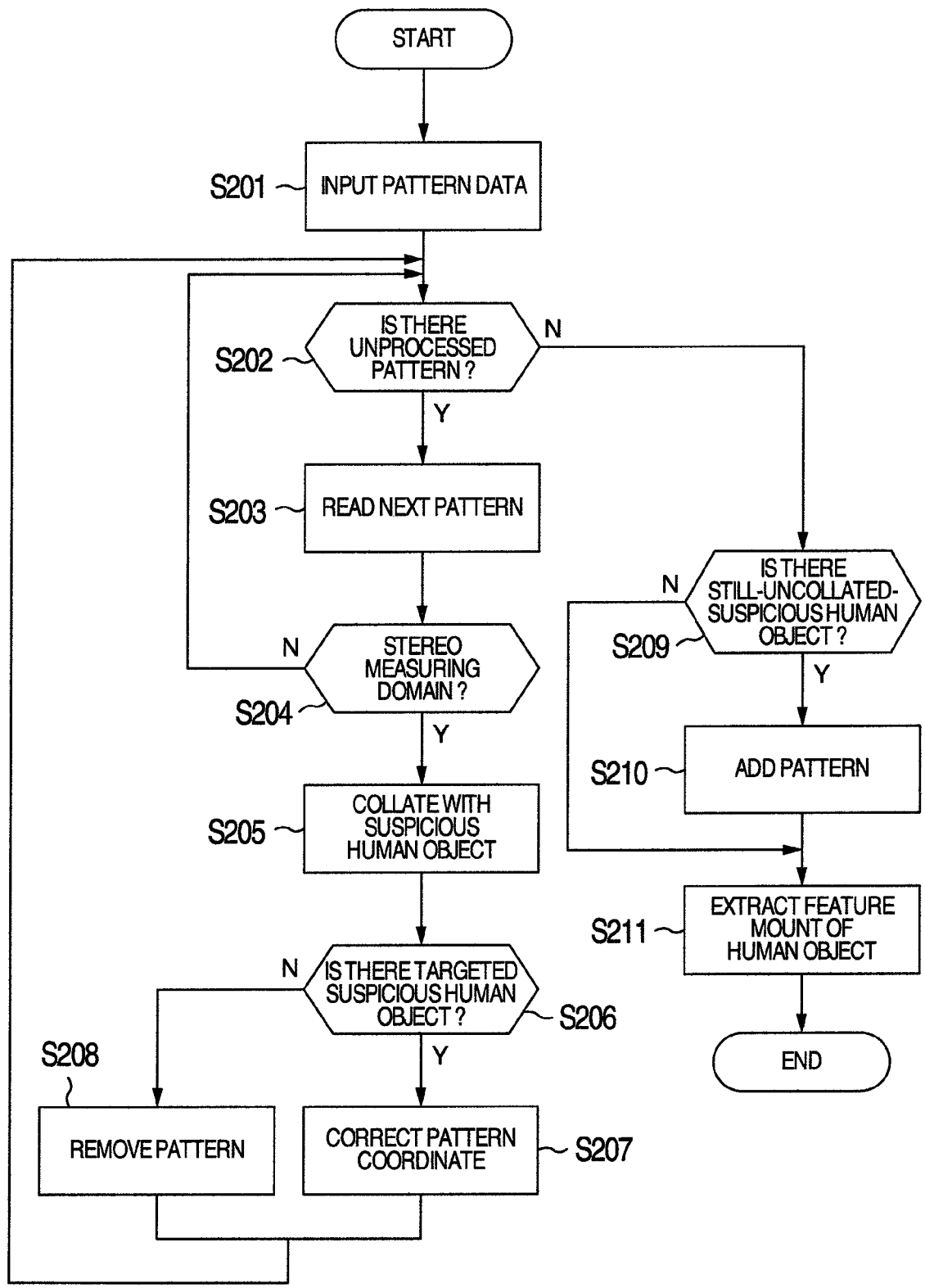
FIG. 11 is a processing flow diagram of a pattern updating unit.

FIG. 11 is a diagram showing a processing flow of the pattern updating unit 205. First, the patter data table is read from the pattern holding unit 202 (step S201). The process judges whether there is an unprocessed pattern among the patterns stored in the pattern data table (step S202). If there is the unprocessed pattern (step S202, Y, in this case), the unprocessed pattern is read (step S203). The process judges whether a position coordinate of the unprocessed patter is resided in an overlapping domain (step S204). The overlapping domain means the stereo measuring domain (overlapping image domain) 400 where the shot area 111 is overlapped with the shot area 112 shown in FIG. 4. When the process judges that the pattern is contained in the stereo measuring domain 400, the pattern is collated with a pattern held in the unit 206 (step S205). As a result of the collation, if there is a targeted pattern (step S206, Y, in this case), an updating is applied to the coordinate of pattern image in the pattern data table by the targeted pattern and to the number of pixels in the vertical and horizontal surrounding rectangle (step S207). On the contrary, if there is no targeted pattern in the stereo measuring domain 400 (step S206, N, in this case), the pattern in the pattern data table is deleted (step S208). At the step S204, when the process judges that the pattern is not contained in the stereo measuring domain 400, it returns to the step S202 to repeat the steps.

When the processing is completed for all of the patterns (step S202, N, in this case), the process judges whether there is a pattern in the suspicious human object which is not collated with the pattern data table (step S209). If there is a still-uncollated-suspicious human object, a new record is added to the pattern data table as a newly detected human (step S210). The feature amount containing the brightness pattern etc. is extracted on the basis of the coordinate and the number of pixels in the vertical and horizontal surrounding rectangle in the pattern data table which is rewritten by the removal, correction and addition by the foregoing processing (step S211), and the processing in the pattern updating unit 205 is then completed.

Figures 12A, 12B:
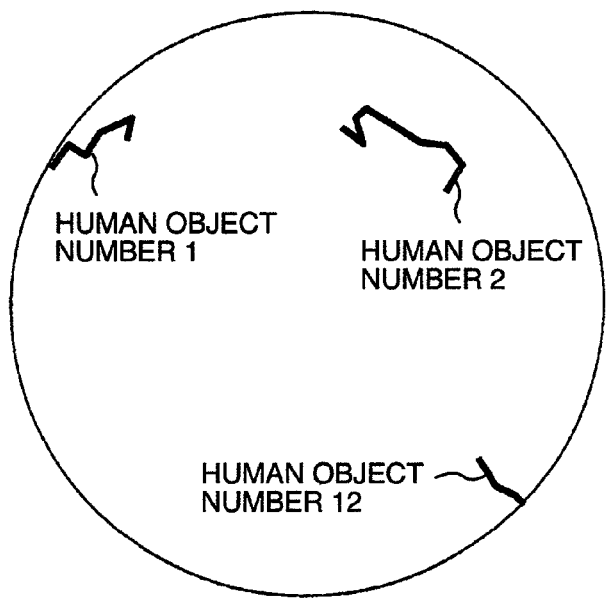
FIG. 12A is a diagram showing trajectory data generated by a local trajectory generating unit.
FIG. 12B is a diagram showing an example of a human trajectory.

FIGS. 12A and 12B are diagrams showing an example of data output from the local trajectory generating units 104 and 204 to the trajectory merging unit 301. The local trajectory generating units 104 and 204 transmit the position coordinates of human object on the predetermined number of frames (for example, 30 frames) with the human ID set to an index for every predetermined time period (for example, one second). The trajectory merging unit 301 links the position coordinates of the same human object on the respective frames, as a linear or curved line, to obtain a movement trajectory of the human object.

In the case of FIGS. 12A and 12B, it is assumed that the human is moving in the shot area covered by the wide-angle camera 101. As described above, in the case where the human left the shot area once and comes in that area again, a new human ID is assigned to that human object even though it is the same. In FIGS. 12A and 12B, the human ID are numbered by 1 to 12, however, may also be indicated by an ID of the camera, a time when the trajectory is detected at the beginning, a frame number, a unique value generated from a coordinate value on the floor coordination system of the firstly detected position.

FIG. 12A shows an example of trajectory data generated by the local trajectory generating units 104, 204. The trajectory data contains the position coordinates on the 30 frames containing every human ID, and is transmitted to the human pursuit system management device 30 for every predetermined time interval (time s1, s2, . . . ). The trajectory data in FIG. 12 indicates that the data transmitted at every time is, in turn, accumulated.

FIG. 12B is a diagram representing an example of a human trajectory which is made visible on the basis of the foregoing transmitted trajectory data. In FIG. 12B, the trajectories for the human ID "1", "2" and "12" are shown on the basis of the trajectory data transmitted at a timing of s1.

Figure 13:
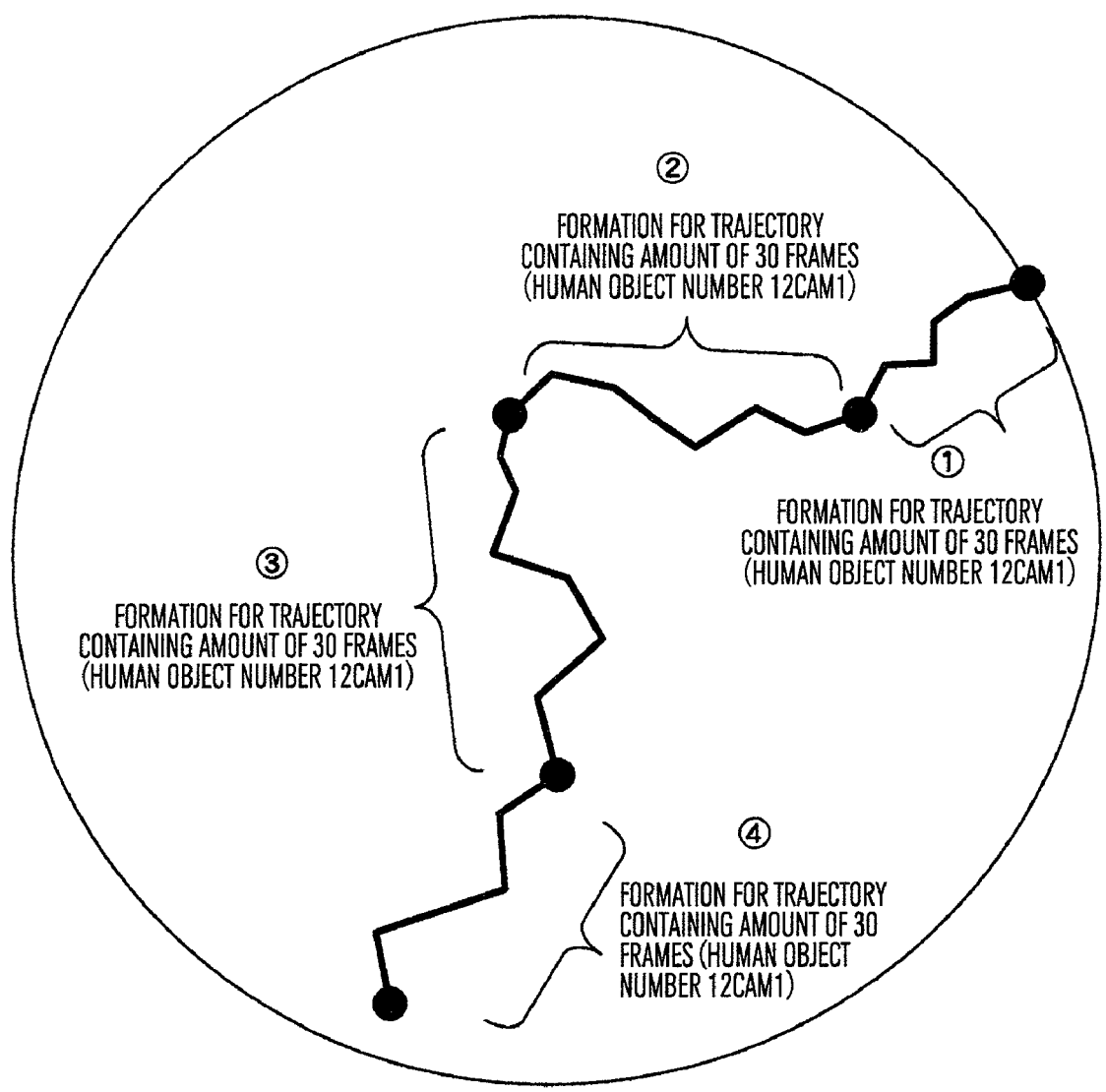
FIG. 13 is a diagram showing an example of a trajectory merging processing.

FIG. 13 shows a trajectory aspect drawn by the human pursuit system management device 30 on the basis of the trajectory data which is composed of a single unit containing 30 frames generated by the local device 11, when the trajectory data is transmitted by four times. The human pursuit system management device 30 transforms the human IDs given by the respective local devices into a format containing such "the human IDs given by the local devices" plus "IDs of the local devices." Assuming that the respective IDs for the local devices 11, 12, . . . , 19 are set to CAM1, CAM2, . . . , CAM19, the human ID "12" of local device 11 is transformed into "12CAM1." The trajectory merging unit 301 in the human pursuit system management device 30 links the respective coordinate values contained in the trajectory data to be transmitted with the same human IDs, as described above, to thereby form a string of trajectory.

By the foregoing trajectory data communication processing and trajectory merging processing, the movement trajectory of each human object is generated for the human resided in the shot area covered by the wide-angle camera 101 belonging to each local device.

Figure 14:
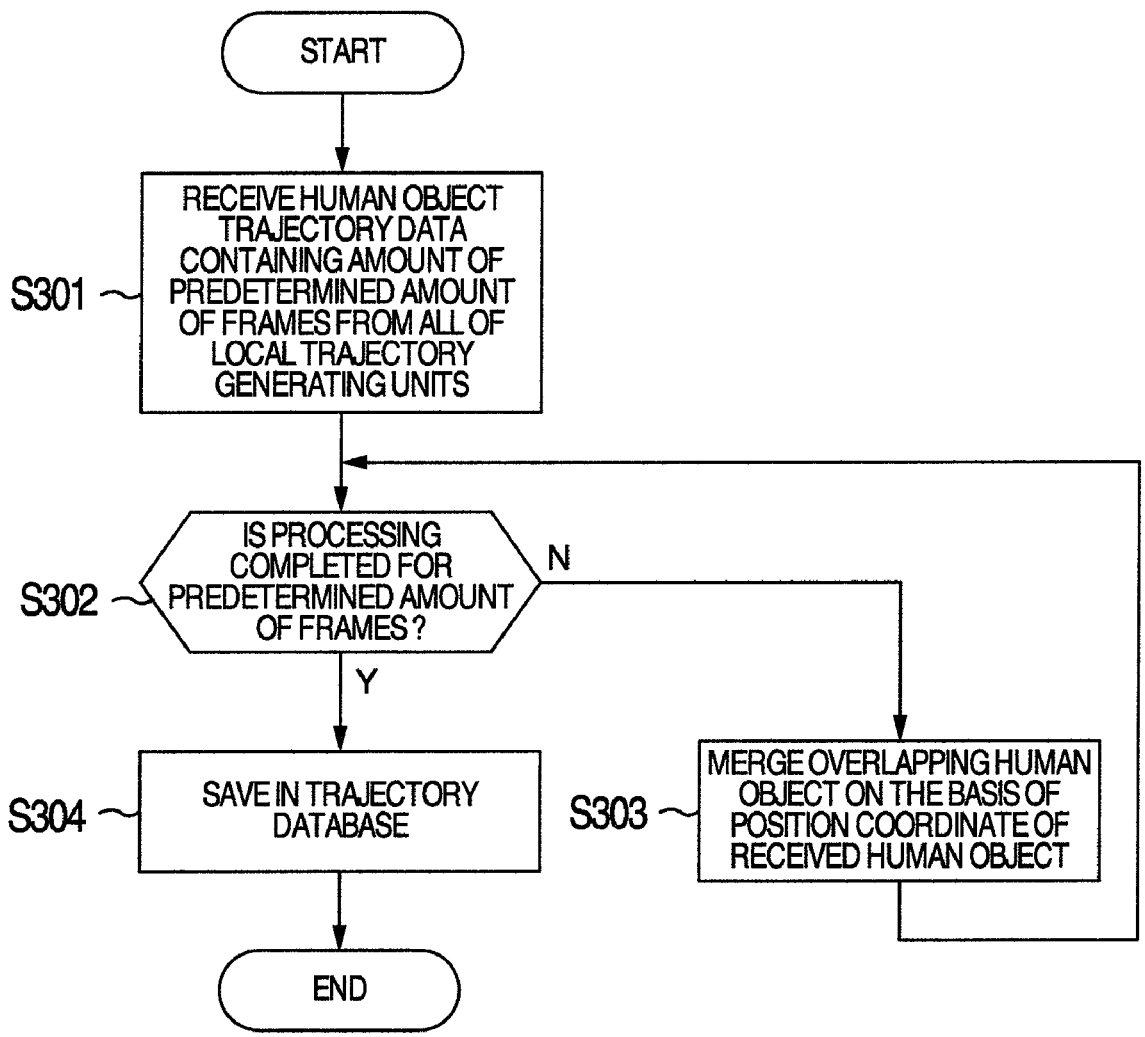
FIG. 14 is a processing flow diagram of a trajectory merging unit.
Figure 15:
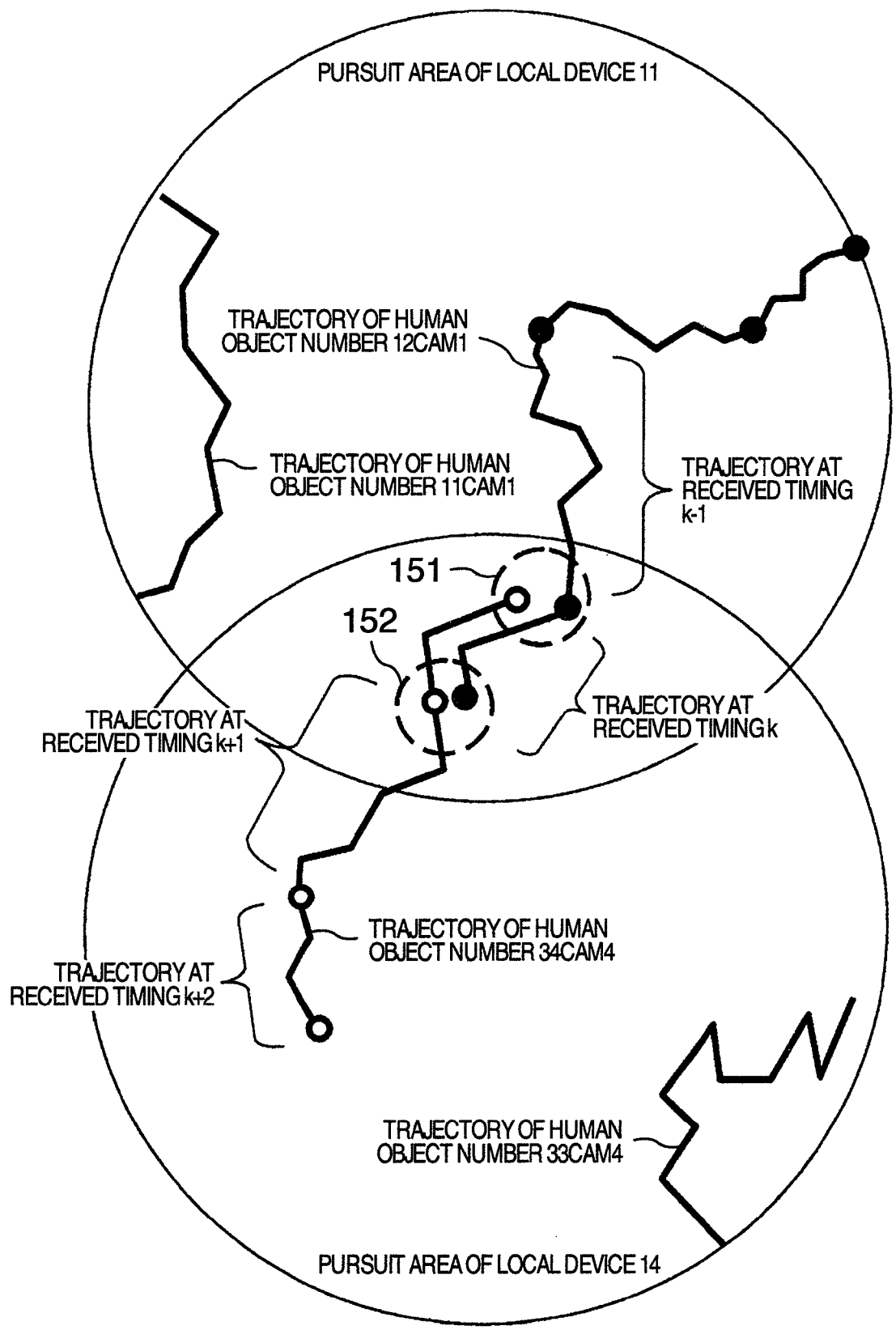
FIG. 15 is a diagram showing an processing example in which overlapping human objects are merged and human IDs are edited.

Referring to FIGS. 14 to 16, by merging the human movement trajectory in the shot area covered by the local device, a processing performed by the human pursuit system management device 30 will be described below.

FIG. 14 is a diagram showing a processing flow of the trajectory merging unit 301. First, the human pursuit system management device 30 receives the trajectory data generated from the local trajectory generating unit in each local device (step S301). It is assumed that each trajectory data is represented by the floor coordination system.

Next, the human pursuit system management device 30 generates a trajectory for each shot area covered by each local device on the basis of each trajectory data which is received. Until the processing is completed for the trajectory data of the predetermined single unit (for example, 30 frames) (step S302, N, in this case), the human ID is edited by setting the trajectory having an overlapping or proximity portion to that for the same human object, among the generated trajectories (step S303). In this way, when the processing is completed for the trajectory data of the predetermined single unit (step S302, Y, in this case), the trajectory data in which the human ID is edited is saved in the trajectory database 302 (step S304). The trajectory merging unit 301 repeats the foregoing processing at every time of receiving the trajectory data.

FIG. 15 is a diagram for explaining a merging processing for the foregoing human objects and trajectories. In FIG. 15, each human object trajectory is illustrated on the basis of the received trajectory data. In the case of an example shown in FIG. 15, the trajectories are illustrated on the basis of the trajectory data generated by the local device 11 at a time k−1 to a time k and the trajectory data generated by the local device 14 at the time k to a time k+2.

The trajectory of the human ID "12CAM1" is approximated to that of the human ID "34CAM4" at the time k. In the case where the trajectories are close to one another, it is determined that the trajectories are belonged to the same human object, consequently, the human objects and trajectories are merged. Whether the trajectories are close to one another is judged by a case where a distance between the floor coordinates of trajectories at the time k is measured, and the distance between the trajectories is continuously remained within a predetermined range (for example, within 40 cm). In this case, the trajectories are determined that "the trajectories are close to one another." The predetermined range may be changed in response to circumstances where the human pursuit system is installed. For example, the predetermined range may be made smaller in the case where a lens distortion of the wide-angle camera in the local device is small and a measuring accuracy for the human position coordinate is high.

FIG. 16 is a diagram for explaining merged trajectory data representing the trajectory merged by the trajectory merging unit 301. The merged trajectory data is data containing a reception time, a time, trajectory data generated by the local trajectory generating unit in each local device, and trajectory merged information representing the trajectories to be merged and its time.

Referring to FIG. 16, periods during which the position coordinates are obtained for the human IDs "11CAM1", "12CAM1", "33CAM4", and "34CAM4" are indicated by lines having arrows at both ends. The foregoing merged trajectory data merged by the trajectory merging unit 301 is a conclusively outputted result obtained by the human pursuit system 1 of the invention. According to the foregoing output result, the human movement trajectory is output substantially for the measuring open space in real time.

According to the human pursuit system 1 in the embodiment described above, the human movement trajectory can be pursued in high accuracy even in the open space where the blocking objects are resided therein. Further, it is possible to know, substantially in real time, a moving direction, a moving speed, a staying time, etc. of every human object in accordance with the movement trajectory of every human body. Therefore, the human pursuit system 1 can be used for a security system by giving a mark to a suspicious human object on a display screen in response to the foregoing conditions and also giving a warning to an outside.

Further, the human pursuit system 1 in the embodiment can be used in an open space other than retail stores since devices such as non-contact IC tag etc. are not used. The human pursuit system 1 can also be installed in a building where the ceiling is low level since the camera is faced to the floor to hardly occur a blocking against a human resided in a distance, caused by a human resided close to the camera.

Further, the human pursuit system 1 in the foregoing embodiment is not sustained from infringement of individual privacy since each of the human movement trajectory is measured and recorded without specifying the human. In addition, the foregoing embodiment is applicable also in the case where an individual is specified to pursue its movement trajectory, because it is possible to measure and record easily the individual movement trajectory in association with specified user information by giving a non-contact radio tag to each human, by installing a radio tag reader in a specific area, and by reading the non-contact radio tag of each human at points, such as an entrance or exit of the specific area.

In addition, the invention is not limited to the foregoing embodiment. For example, in the embodiment, the trajectory merging unit 301 enables the output data to be stored in the trajectory database 302, which enables old trajectory data to reproduce itself. The human pursuit system 1 of the invention can be used for a marketing system for measuring movement paths of customers and the number of incoming customers in the retail store, and also for a security system for loiterers who stay in too long or walk back and forth in the store.

Furthermore, the human pursuit system 1 in the embodiment is applicable easily to a customer information collecting system for collecting information of the customer types since a number of the human movement trajectories are measured continuously, and path information in response to the gender and age of the customers can be obtained by once entering attributes the gender, age, etc. of the customers from a visual judgment by a shop clerk or an automatic judging device at the counter located at the exit or entrance of the store.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A human pursuit system, comprising:
   a plurality of cameras installed on a ceiling and shooting directions of these directed toward a floor;
   means that calculates a parallax of an object reflected in an overlapping image domain in accordance with at least a portion of the overlapping image domain where images are overlapped, among shot images shot respectively by the plurality of cameras;
   means that detects the object, as a human, when the calculated parallax is equal to or greater than a predetermined threshold value;
   means that extracts a pattern image containing the detected human object; and
   means that pursues a trajectory on which the human object moves, by a pattern matching of the extracted pattern image with the shot image by the camera.

2. The human pursuit system according to claim 1, further comprising calculation means that calculates a position coordinate of the human object residing on the floor in accordance with a position of the pattern image containing the detected human object and the parallax calculated for the human object.

3. The human pursuit system according to claim 1, further comprising:
   storage means that stores the extracted pattern image for every detected human object; and
   update means that updates the pattern image stored in the storage means in accordance with a result of the pattern matching.

4. The human pursuit system according to claim 3, wherein the storage means further stores the position coordinate of the pattern image on the floor in association with the pattern image, and
   the update means updates the pattern image in accordance with an image domain of the human object detected from the overlapping image domain in a case where the stored pattern image is contained in the overlapping image domain.

5. The human pursuit system according to claim 4, wherein the update means removes the pattern image in a case where the stored pattern image is contained in the overlapping image domain and the human object is undetected from the overlapping image domain.

6. The human pursuit system according to claim 1, further comprising means that extracts feature amount data from the pattern image, wherein the extracted feature amount data is used for the pattern matching.

7. The human pursuit system according to claim 6, wherein the feature amount data includes at least one of a brightness pattern, a color histogram, a ratio of color components, an edge histogram, a Fourier spectrum, and a Fourier-Mellin spectrum.

8. The human pursuit system according to claim 7, further comprising means that generates a trajectory on which the detected human object moves every shot domain pursued by the plurality of cameras.

9. The human pursuit system according to claim 8, further comprising means that merges the generated trajectories for every detected human object.

10. The human pursuit system according to claim 1, wherein the plurality of cameras are adjusted respectively such that a shooting angle is directed toward a vertically downward direction.

11. The human pursuit system according to claim 1, further comprising means that stores attribute information obtained for the detected human object in association with the trajectory obtained for the detected human object.

12. The human pursuit system according to claim 11, wherein the attribute information is obtained from reading non-contact radio tag information provided for the human object.

13. A human pursuit system, comprising:
   means that obtains images shot by a plurality of cameras installed on a ceiling, and shooting directions of these directed toward a floor;
   means that calculates a parallax of an object reflected in an overlapping image domain in accordance with at least a portion of the overlapping image domain where the images are overlapped, among shot images shot respectively by the plurality of cameras;
   means that detects the object, as a human, when the calculated parallax is equal to or greater than a predetermined threshold value;
   means that extracts a pattern image containing the detected human object; and
   means that pursues a trajectory on which the human object moves, by a pattern matching of the extracted pattern image with the shot image by the camera.

14. A non-transitory computer-readable medium embodying a human pursuit program readable, as program codes, by a computer, comprising:
   program code means that obtains images shot by a plurality of cameras installed on a ceiling, and shooting directions of these directed toward a floor;
   program code means that calculates a parallax of an object reflected in an overlapping image domain in accordance with at least a portion of the overlapping image domain where the images are overlapped, among shot images shot respectively by the plurality of cameras;
   program code means that detects the object, as a human, when the calculated parallax is equal to or greater than a predetermined threshold value;
   program code means that extracts a pattern image containing the detected human object; and
   program code means that pursues a trajectory on which the human object moves, by a pattern matching of the extracted pattern image with the shot image by the camera.

* * * * *